United States Patent [19]

Sakai et al.

[11] Patent Number: 5,206,293
[45] Date of Patent: Apr. 27, 1993

[54] RUBBER COMPOSITION AND CROSSLINKABLE RUBBER COMPOSITION

[75] Inventors: Masato Sakai; Isao Sugita, both of Suzuka; Itsuki Umeda, Mie; Yoji Mori, Yokohama, all of Japan

[73] Assignee: Japan Synthetic Rubber Co., Ltd., Tokyo, Japan

[21] Appl. No.: 593,740

[22] Filed: Oct. 5, 1990

[30] Foreign Application Priority Data

Oct. 13, 1989 [JP] Japan .................. 1-267527

[51] Int. Cl.$^5$ .............. C08L 27/12; C08L 23/00; C08L 33/04; C08L 33/02
[52] U.S. Cl. .................. 525/194; 525/198; 525/199; 525/240; 525/221; 525/222
[58] Field of Search .............. 525/194, 198, 199, 240, 525/221, 222

[56] References Cited

U.S. PATENT DOCUMENTS

| | | | |
|---|---|---|---|
| 4,252,858 | 2/1981 | Chao et al. | 525/199 |
| 4,708,988 | 11/1987 | Tabb | 525/194 |
| 4,931,499 | 6/1990 | Sakai et al. | 525/194 |
| 5,008,340 | 3/1991 | Guerra et al. | 525/199 |
| 5,059,480 | 10/1991 | Guerra et al. | 525/194 |

FOREIGN PATENT DOCUMENTS

| | | |
|---|---|---|
| 317346 | 5/1989 | European Pat. Off. . |
| 1290716 | 3/1969 | Fed. Rep. of Germany . |
| 2226410 | 11/1974 | France . |
| 49-133442 | 12/1974 | Japan . |
| 53-146752 | 12/1978 | Japan . |
| 54-93040 | 7/1979 | Japan . |
| 55-160037 | 12/1980 | Japan . |
| 57-135843 | 8/1982 | Japan . |
| 60-206857 | 10/1985 | Japan . |
| 62-34935 | 2/1987 | Japan . |
| 62-121749 | 6/1987 | Japan . |

OTHER PUBLICATIONS

Database Chemical Abstracts, (Host:STN), 1982, No. 98 (4):17901r, Columbus, Ohio, US; & JP-A-57 135 844 (Japan Synthetic Rubber Co.) Aug. 21, 1982.
Database Chemical Abstracts (Host:STN) 1987, No. 107 (8):60122d, Columbus, Ohio, US; & JP-A-62 015 244 (Fujikura Ltd.) Jan. 23, 1987.

Primary Examiner—James J. Seidleck
Assistant Examiner—W. R. H. Clark
Attorney, Agent, or Firm—Oblon, Spivak, McClelland, Maier & Neustadt

[57] ABSTRACT

A rubber composition obtained by subjecting a mixture of (I) 35-95 parts by weight of a fluoroelastomer, (II) 65-5 parts by weight of at least one member selected from the group consisting of polyethylene, ethylene-vinyl acetate copolymer and ethylene-unsaturated carboxylic acid ester copolymer, and an organic peroxide to reaction while imparting shearing deformation to the mixture. A crosslinkable rubber composition can be obtained by compounding the above rubber composition with a crosslinking agent for the fluoroelastomer (I). The above rubber composition is superior in processability, particularly extrusion-processability, sealing property, heat resistance, steam resistance and weather resistance.

14 Claims, No Drawings

RUBBER COMPOSITION AND CROSSLINKABLE RUBBER COMPOSITION

This invention relates to a rubber composition, and more particularly to a rubber composition comprising, as main components, a fluoroelastomer and at least one member selected from the group consisting of a polyethylene, an ethylene-vinyl acetate copolymer and an ethylene-unsaturated carboxylic acid ester copolymer (referred to hereinafter as the ethylenic resin) and being excellent in processability, particularly extrusion-processability; sealing property; heat resistance; steam resistance and weather resistance.

The requirement for performance of rubber material has recently become severe year by year, and a change has started in the type of rubber material to be used. Fluoroelastomer excels other special rubbers in solvent resistance, heat resistance, chemical resistance and weather resistance, and the demand thereof is increasing in fields of industrial product, automobile and aircraft year by year. However, the fluoroelastomer is much more expensive than the other elastomers, and has higher specific gravity than the others. Therefore, the price of products made therefrom becomes remarkably high, and hence, the field in which fluoroelastomer is used has been limited. It has become difficult for one sort of rubber stock to satisfy both of the inconsistent requirements of high performance and low price as mentioned above.

In order to meet such requirements, it has been proposed to mix a fluoroelastomer with another elastomer. The elastomer to be mixed with the fluoroelastomer is often an elastomer having a polar group such as acrylonitrile-butadiene rubber, acrylic rubber, chlorohydrin rubber or the like.

Even when such an elastomer having a polar group is mixed with the fluoroelastomer, however, no mixture having sufficiently satisfactory performance has been obtained as yet because it has been difficult to obtain a uniform mixing state between the elastomer and the fluoroelastomer.

On the other hand, a mixture of a fluoroelastomer with an ethylene-α-olefin copolymer rubber which is a non-polar elastomer is described in, for example, Japanese Patent Application Kokai No. 01-135851, in which proposed is a method of compounding a fluoro-elstomer and an ethylene-α-olefin copolymer rubber with a crosslinking agent for the ethylene-α-olefin copolymer rubber and subjecting them to reaction while imparting shearing deformation to them, to obtain the above-mentioned mixture. This fluoroelastomer composition, when subjected to extrusion, gives an extrudate of good surface skin but poor edge shape, and accordingly has been insufficient for production of an extrudate of complex shape.

The present inventors have made study for solving the above-mentioned problems of the prior art and found that the compatibility between fluoroelastomer and the ethylenic resin is significantly improved by adding an organic peroxide and, as a result, a rubber compound can be obtained which is excellent in processability, particularly extrusion-processability; sealing property; heat resistance; steam resistance and weather resistance.

According to this invention, there is provided a rubber composition obtained by subjecting a mixture of (I) 35-95 parts by weight of a fluoroelastomer, (II) 65-5 parts by weight of the ethylenic resin and an organic peroxide to reaction while imparting shearing deformation to the mixture (said composition is referred to hereinafter as "fluoroelastomer composition" in some cases).

This invention further provides a crosslinkable rubber composition obtained by adding a crosslinking agent for the elastomer (I) to the above rubber composition.

The fluoroelastomer (I) used in this invention includes (co)polymers of at least one fluorine-containing monomer selected from vinylidene fluoride, hexafluoropropylene, pentafluoropropylene, trifluoroethylene, trifluorochloroethylene, tetrafluoroethylene, vinyl fluoride, perfluoro(methyl vinyl ether), perfluoro(propylidene) and the like, and rubbers prepared by copolymerizing the above fluorine-containing monomer with monomers copolymerizable therewith such as vinyl compounds, for example, acrylic acid esters and the like; olefin compounds, for example, propylene and the like; diene compounds; and chlorine-, bromine- or iodine-containing compounds.

Specific examples of the fluoroelastomer (I) are vinylidene fluoride-hexafluoropropylene copolymer, vinylidene fluoride-hexafluoropropylene-tetrafluoroethylene terpolymer, tetrafluoroethylene-propylene copolymer, tetrafluoroethylene-vinylidene fluoride-propylene terpolymer and the like.

The fluoroelastomer (I) includes specifically Aflas series (products of Japan Synthetic Rubber Co., Ltd.), Viton GF (product of DuPont, U.S.A.), Daiel G902 (product of Daikin Kogyo), Viton A, Viton B and Viton E60 (products of DuPont, U.S.A.), Technoflon (product of Montefluos, Italy) and the like.

The Mooney viscosity ($ML_{1+4}$, 100° C.) of the fluoroelastomer (I) is not critical but may be preferably 30-150.

The ethylenic resin (II) of the present invention is selected from polyethylene, ethylene-vinyl acetate copolymers and ethylene-unsaturated carboxylic acid ester copolymers. The unsaturated carboxylic acid ester includes methyl (meth)acrylate, ethyl (meth)acrylate, butyl (meth)acrylate, etc. The ethylenic resin (II) is preferably an ethylene-vinyl acetate copolymer having a vinyl acetate content of 5-45% by weight.

The melt flow index (190° C., 2160 g) of the ethylenic resin (II) is not critical but is preferably 0.5-150 g/10 min. more preferably 1-40 g/10 min.

The ethylenic resin (II) may be a saponification product and/or an addition product obtained by adding a halogen, an unsaturated dicarboxylic acid, an unsaturated dicarboxylic acid anhydride, maleimide or the like.

The weight ratio of the fluoroelastomer (I) to the ethylenic resin (II) in the rubber composition of this invention is 35-95/65-5, preferably 65-90/35-10 in which (I)+(II)=100 parts by weight. When the proportion of the fluoroelastomer (I) is less than 35 parts by weight, the heat resistance which is characteristic of fluoroelastomer is greatly deteriorated, and when the proportion of the ethylenic resin (II) is less than 5 parts by weight, extrusion-processability is inferior.

In this invention, the organic peroxide to be mixed with the fluoroelastomer (I) and the ethylenic resin (II) includes, for example, 2,5-diemthyl-2,5-di(t-butylperoxy)hexyne-3, 2,5-dimethyl-2,5-di(t-butylperoxy)hexane, α,α'-bis(t-butylperoxy)-p-diisopropylbenzene, dicumyl peroxide, di-t-butylperoxide, t-butyl perbenzoate, 1,1-bis(t-butylperoxy)-3,3,5-trimethylcyclohexane, 2,4- dichlorobenzoyl peroxide, benzoyl peroxide, p-chlorobenzoyl peroxide and the like. Of these, preferable are 2,5-dimethyl-2,5-di(t-butylperoxy)hexyne-3, 2,5-dimethyl-2,5-di(t-butylperoxy)hexane and α,α'-bis(t-butylperoxy)-p-diisopropylbenzene.

These organic peroxides may be used alone or in admixture of two or more.

The amount of the organic peroxide used is preferably 0.01–5 parts by weight, more preferably 0.05–2 parts by weight, per 100 parts by weight of a total of the fluoroelastomer (I) and the ethylenic resin (II). When the amount is less than 0.01 part by weight, the crosslinking of the ethylenic resin (II) is not sufficient, the processability of the rubber composition is not sufficient, and the compression set, resistance to compressive load, etc. of vulcanizate of the composition are not sufficient. On the other hand, when the amount exceeds 5 parts by weight, the fluoroelastomer (I) becomes crosslinked, too and the processability tends to be deteriorated thereby. Also, the composition obtained becomes inferior in physical properties of vulcanizate such as mechanical strengths, elongation and the like.

In crosslinking with the organic peroxide, a bifunctional vinyl monomer or the like may be used as a crosslinking co-agent.

Such a crosslinking co-agent includes ethylene glycol dimethacrylate, 1,3-butanediol dimethacrylate, 1,4-butanediol dimethacrylate, 1,6-hexanediol dimethacrylate, polyethylene glycol dimethacrylate, 1,4-butanediol diacrylate, 1,6-hexanediol diacryalte, 2,2'-bis(4-methacryloyldiethoxyphenyl)propane, trimethylolpropane trimethacrylate, trimethylolpropane triacrylate, pentaerythritol triacrylate, divinylbenzene, N,N'-methylenebisacrylamide, p-quinone dioxime, p,p'-dibenzoylquinone dioxime, triazinethiol, triallyl cyanurate, triallyl isocyanurate, bismaleimide, etc.

The amount of the crosslinking co-agent added is usually 0.1–20 parts by weight, preferably 0.5–7 parts by weight, per 100 parts by weight of the rubber components consisting of the (I) component and the (II) component.

In this invention, the addition of the organic peroxide to the mixture of the fluoroelastomer (I) and the ethylenic resin (II) may be conducted by adding the (I) component, the (II) component and the organic peroxide simultaneously and kneading the resulting mixture, or by previously mixing the (I) component with the (II) component, then adding the organic peroxide to the resulting mixture and kneading the mixture.

The mxiing and kneading may be effected by means of an extruder, a Banbury mixer, a kneader or a roll at a temperature of 50°–250° C., preferably 100°–200° C., for a period of 2 minutes to 1 hour, preferably about 3–45 minutes. The preferable kneading is effected by means of an internal mixer such as Banbury mixer, kneader or the like.

In this case, when crosslinking occurs at a kneading temperature of less than 50° C., the control of the reaction is diffcult. On the other hand, when the kneading temperature exceeds 250° C., the rubber tends to be deteriorated.

When the kneading time is shorter than 2 minutes, the control of the reaction is difficult and a uniform composition is difficult to obtain. On the other hand, when the kneading time is longer than 1 hour, the kneading cost increases.

The kneading temperature during adding the organic peroxide is usually 10°–200° C., preferably 20°–150° C., and when the organic peroxide is used, the kneading temperature during adding the organic peroxide is preferably such a temperature that the half-life period of the peroxide is 1 minute or less.

As described above, the above-mentioned crosslinking in this invention must be effected during the mixing, because during the mixing, a shearing force is applied to the elastomers, and therefore, the dispersed particles of the ethylenic resin (II) are kept smaller and entanglement of more molecules takes place at the interface.

In this case, when the application of a shearing force is stopped, association takes place between the dispersed particles of the ethylenic resin (II), whereby the particles are made larger and the degree of entanglement of molecules is reduced.

Thus, the system can be fixed in a good dispersion state by effecting the mixing of the components and the crosslinking of the ethylenic resin (II) simultaneously.

The rubber compsoition of this invention comprises the (I) component and the (II) component as the main components and may further comprise other conventional elastomers, for example, diene rubbers such as styrene-butadiene rubber (SBR), isoprene rubber (IR), acrylonitrile-butadiene rubber (NBR), chloroprene rubber (CR) and the like; or saturated rubbers such as butyl rubber, acrylic rubber, ethylene-propylene rubber, chlorosulfonated polyethylene and the like in a proportion of about 10% by weight or less based on the total weight of the (I) and (II) components, and also may comprise various compounding agents used conventionally.

These compounding agents may, if necessary, be added in the course of producing the rubber composition of this invention, or after the production of the rubber composition.

The reinforcing filler and extender which can be added as compounding agents, include, for example, carbon black, fumed silica, precipitated silica, finely divided quartz, diatomaceous earth, zinc oxide, basic magnesium carbonate, active calcium carbonate, magnesium silicate, aluminum silicate, calcium silicate, titanium dioxide, talc, mica powder, aluminum sulfate, calcium sulfate, barium sulfate, asbestos, graphite, wollastonite, molybdenum disulfide, carbon fiber, aramid fiber, various whiskers, glass fiber, organic reinforcing agent and organic filler.

The dispersing agent which can be added as a compounding agent, includes higher fatty acids and their metal and amine salts; the plasticizer includes, for example, phthalic acid derivatives, adipic acid derivatives and sebacic acid derivatives; the softening agent includes, for example, lubricating oils, process oils, coal tar, castor oil and calcium stearate; the antioxidant includes, for example, phenylenediamines, phosphates, quinolines, cresols, phenols and metal dithiocarbamates. Besides, there may be used, necessary, a coloring agent, an ultraviolet absorber, a flame retardant, an oil-resistance improver, a foaming agent, an anti-scroching agent, a tackifier, etc.

The above-mentioned rubber composition is kneaded with a crosslinking agent for the fluoroelastomer (I) such as a combination of an organic peroxide with a crosslinking co-agent, a combination of a polyol-type crosslinking agent with an accelerator for polyol crosslinking or a diamine-type crosslinking agent by a conventional kneading means such as roll, Banbury mixer or the like to prepare a crosslinkable rubber composition. The crosslinkable rubber composition is then subjected to molding and crosslinking under conventional conditions for producing vulcanized rubbers, whereby a crosslinked rubber product can be produced.

As the polyol-type crosslinking agent, there are preferably used polyhydroxyaromatic compounds such as hydroquinone, bisphenol A, bisphenol AF and salts thereof. Fluorine-containing aliphatic diols may also be used.

These polyol-type crosslinking agents may be usually added in an amount of 0.1-20 parts by weight, preferably about 1-10 parts by weight, per 100 parts by weight of the rubber composition.

As the accelerator for polyol crosslinking used in combination with the polyol-type crosslinking agent, there are preferred quaternary ammonium compounds such as methyltrioctylammonium chloride, benzyltriethylammonium chloride, tetrahexylammonium tetrafluoroborate, 8-methyl-1,6-diazacyclo(5.4.0)-7-undecenyl chloride and the like; and quaternary phosphonium compounds such as benzyltriphenylphosphonium chloride, m-trifluoromethylbenzyltrioctylphosphonium chloride, benzyltrioctylphosphonium bromide and the like.

The amount of the crosslinking accelerator added is usually about 0.2-10 parts by weight per 100 parts by weight of the rubber composition.

The diamine-type crosslinking agent includes alkylamines such as hexamethylenediamine, tetraethylenepentamine, triethylenetetramine and the like; aromatic amines such as aniline, pyridine, diaminobenzene and the like; and salts of these amines with fatty acids such as carbamic acid, cinnamylideneacetic acid and the like.

The amount of the diamine-type crosslinking agent added is usually 0.1-10 parts by weight, preferably about 0.5-5 parts by weight, per 100 parts by weight of the rubber composition.

The crosslinking agent for the fluoroelastomer (I) is selected and decided depending upon the kind of the fluoroelastomer (I) used.

In this invention, specific examples of the crosslinking agent for the fluoroelastomer (I) include the following combinations:

1) when the fluoroelastomer (I) is a fluoroelastomer obtained by copolymerizing a vinylidene fluoride-hexafluoropropylene copolymer and/or a vinylidene fluoride-hexafluoropropylene-tetrafluoroethylene terpolymer with a diene compound, a chlorine-, bromine- or iodine-containing vinyl compound or the like, and/or a vinylidene fluoride-propylene-tetrafluoroethylene terpolymer, the crosslinking agent for the fluoroelastomer (I) is
   (i) a diamine-type crosslinking agent,
   (ii) a polyol-type crosslinking agent, or
   (iii) a combination of an organic peroxide and a crosslinking co-agent, 2) when the fluoroelastomer (I) is a vinylidene fluoride-hexafluoropropylene copolymer and/or a vinylidene fluoride-hexafluoropropylene-tetrafluoroethylene terpolymer, the crosslinking agent for the fluoroelastomer (I) is
   (i') a diamine-type crosslinking agent, or
   (ii') a polyol-type crosslinking agent, and 3) when the fluoroelastomer (I) is a tetrafluoroethylene-propylene copolymer, the crosslinking agent for the fluoroelastomer (I) is
   (i'') a combination of an organic peroxide and a crosslinking co-agent.

The crosslinking of the crosslinkable fluoroelastomer composition is usually achieved by subjecting the composition to primary crosslinking at a temeprature of 80°-200° C. for a period of several minutes to 3 hours at a pressure of 20-200 kg/cm$^2$ and, if necessary, post curing at a temperature of 80°-200° C. for a period of 1-48 hours, whereby a crosslinked fluoroelastomer product is produced.

As mentioned above, the fluoroelastomer composition of this invention can be uniformly kneaded by a kneading means such as Banbury mixer, kneader, twin roll or the like.

When the crosslinking agent for the fluoroelastomer (I) is kneaded with a mere mixture of the fluoroelastomer (I) and the ethylenic resin (II) (which may contain additives such as filler and the like) on roll and the kneaded product is subjected to extrusion molding, the edge portion of the extrudate cannot be shaped, making it impossible to obtain an extrudate of complex shape, and a very long period of time is required for winding the mixture around the roll. However, when the rubber composition of this invention is used, the extrudability of the edge portion is improved, making it possible to obtain an extrudate of complex shape, and in kneading operation the rubber composition of this invention can be wound around the roll in a moment and hence has a remarkably improved workability.

Moreover, the rubber elastomers obtaiend by vulcanizing the rubber composition of this invention are excellent in heat resistance, weather resistance and compression set, and can be used in the fields of general industry, electric industry and chemical industry.

This invention is explained in more detail below referring to Examples. In the Examples, various measurements were made according to the following methods.

Extrudability: Extrusion-processability was evaluated using a Garvey die, in accordance with the A method of ASTM D 2230.

Roll processability: To 6-in rolls was applied a rubber compound at a surface temperature of 50° C. at a revolution rate (front/rear) of 20/28 rpm at a roll nip of 2 mm and the roll nip at which the rubber compound was completely wound around the roll was determined.

Initial physical properties, aging test, steam immersion test, compression set test: Evaluated in accordance with JIS K 6301, using the conditions indicated in Table 1.

Resistance to compressive load (compression stress): Evaluated using a compression set test sample (right cylinder of 12.70 mm±0.13 mm in thickness and 29.0 mm in diameter) under the following conditions:

| Measuring temperature | 150° C. |
|---|---|
| Compression rate | 10 mm/min |
| Compression ratio | 0-50% |
| Tester | IS 5000 (autograph produced by Toyo Seiki Seisakusho) |

EXAMPLES 1 TO 5 AND COMPARATIVE EXAMPLE 1

Aflas 150P (trade name of Japan Synthetic Rubber Co., Ltd. for tetrafluoroethylene-propylene copolymer) or Viton GF (trade name of DuPont, U.S.A. for vinylidene fluoride-hexafluoropropylene-tetrafluoroethylene terpolymer having organic peroxide-crosslinking sites, used in Example 4) as a fluoroelastomer, Evaflex P1905 or P1907 (trade name of Mitsui Polychemical K.K. for ethylene-vinyl acetate copolymer) (P1907 used in Example 5) as an ethylenic resin, sodium stearate as a processing aid, Nipsil LP (trade name of Nippon Silica Kogyo K.K. for precipitated silica) as a silica-type filler, MT carbon (used in Example 3) as a carbon black and a silane compound TSL 8380 (trade name of Toshiba Silicone Co., Ltd. for 3-mercaptopropyltrimethyloxysilane) were placed in a rubber mixer (70°-100° C., 60 rpm) in this order and kneaded therein. When a uniform state was reached, Perkadox 14 (trade name of Kayaku Akzo Corp. for $a,a'$-bis(t-butylperoxy)-p-diisopropylbenzene) as an organic peroxide was added to the mixture and the resulting mixture was kneaded. When a uniform state was reached again, the temperature was elevated to 170°-180° C. and after the kneading torque and rubber temperature became substantially constant (after about 10-20 minutes), Irganox 1010 (trade name of Ciba-Geigy Corp. for tetrakis[methylene-3-(3,5-di-t-butyl-4-hydroxyphenyl)propionate]methane) was added as an antioxidant to the mixture and the mixture was further kneaded. When a uniform state was reached again, the mixture was taken out.

Subsequently, the rubber taken out was wound around a twin roll and processability was evaluated.

The rubber sheet thus obtained was wound again around a twin roll, other compounding agents as shown in Table 1 were added to the sheet, and the mixture was kneaded. The kneaded product was subjected to Garvey die extrusion by an extruder for rubber (50 mm$\phi$, L/D=12) to evaluate extrudability.

The extrudate was sheeted and press-cured (100-150 kg/cm$^2$, 170° C.×20 min), after which physical properties of the vulcanizate obtained were measured. The results obtained are shown in Table 1.

EXAMPLES 6 AND 7

Viton E60 (product of DuPont, U.S.A.) for Aflas 200 (product of Japan Synthetic Rubber Co., Ltd.) or Viton GF (product of DuPont, U.S.A.) as fluoroelastomers and Evaflex P1905 (product of Mitsui Polychemical K.K.) as an ethylenic resin were kneaded in the same manner as in Example 1, and when a uniform state was reached, an organic peroxide and optionally triallyl isocyanurate were added to the mixture and the resulting mixture was kneaded, after which the same procedure as in Example 1 was repeated. The compounding recipes and evaluation results are shown in Table 1.

COMPARATIVE EXAMPLES 2 TO 4

Using the compounding recipes shown in Table 1, rubber compositions and crosslinked rubbers were prepared and evaluated in the same manner as in Example 1, except that no organic peroxide was used as a crosslinking agent for giving rise to crosslinking during kneading. The compounding recipes and evaluation results are shown in Table 1.

COMPARATIVE EXAMPLE 5

A rubber composition and a crosslinked rubber were prepared and evaluated in the same manner as in Example 1, except that the ethylenic resin (II) was replaced by an ethylene-propylene rubber EP02P (product of Japan Synthetic Rubber Co., Ltd.). The compounding recipe and evaluation results are shown in Table 1.

TABLE 1

| | Example | | | | | | | Comparative Example | | | | |
|---|---|---|---|---|---|---|---|---|---|---|---|---|
| | 1 | 2 | 3 | 4 | 5 | 6 | 7 | 1 | 2 | 3 | 4 | 5 |
| [Compounding recipe (parts by weight)] | | | | | | | | | | | | |
| Fluoroelastomer (I) | | | | | | | | | | | | |
| Aflas 150P | 80 | 65 | 80 | | 80 | | | 100 | 80 | 80 | | 80 |
| Aflas 200 | | | | | | 10 | | | | | 10 | |
| Viton E60 | | | | | | 70 | 70 | | | | 70 | |
| Viton GF | | | | 80 | | | 10 | | | | | |
| Ethylenic resin (II) | | | | | | | | | | | | |
| Evaflex P1905 | 20 | 35 | 20 | 20 | | 20 | 20 | | 20 | 20 | 20 | |
| Evalfex P1907 | | | | | 20 | | | | | | | |
| Crosslinking agent (organic peroxide) | | | | | | | | | | | | |
| $a,a'$-bis(t-butylperoxy)-p-diisopropylbenzene | 0.5 | 0.5 | 0.5 | 0.5 | 0.5 | 0.5 | 0.5 | 0.5 | | | | |
| Other compounding agents | | | | | | | | | | | | |
| Sodium stearate | 1 | 1 | 1 | 1 | 1 | 1 | 1 | 1 | 1 | 1 | 1 | 1 |
| Nipsil LP | 10 | 10 | | 10 | 10 | 10 | 10 | 10 | 10 | | 10 | 10 |
| MT carbon | | | 25 | | | | | | | 25 | | |
| 3-Mercaptopropyltrimethoxysilane | 1 | 1 | 1 | 1 | 1 | 1 | 1 | 1 | 1 | 1 | 1 | 1 |
| Irganox 1010 | 1 | 1 | 1 | 1 | 1 | 1 | 1 | 1 | 1 | 1 | 1 | 1 |
| Triallyl isocyanurate | 4 | 4 | 4 | 4 | 4 | 4 | 4 | 4 | 4 | 4 | 4 | 4 |
| $a,a'$-bis(t-butylperoxy)-p-diisopropylbenzene | 1.5 | 1.5 | 1.5 | 1.5 | 1.5 | 1.5 | 1.5 | 1.5 | 1.5 | 1.5 | 1.5 | 1.5 |
| JSR EP02P | | | | | | | | | | | | 20 |

| | Example | | | | | | | Comparative Example | | | | |
|---|---|---|---|---|---|---|---|---|---|---|---|---|
| | 1 | 2 | 3 | 4 | 5 | 6 | 7 | 1 | 2 | 3 | 4 | 5 |
| [Evaluation results] | | | | | | | | | | | | |
| Extrudability: Evaluation by Garvey die | | | | | | | | | | | | |
| shape (edge) | 4 | 4 | 4 | 4 | 4 | 4 | 4 | 2 | 2 | 2 | 2 | 2 |
| shape (surface skin) | 4 | 4 | 4 | 4 | 4 | 4 | 4 | 2 | 2 | 2 | 2 | 4 |
| Roll-processability: Roll nip at which rubber compound can be wound around roll (mm) | >2 | >2 | >2 | >2 | >2 | >2 | >2 | 1.0 | 0.5 | 1.0 | 0.5 | >2 |
| Initial physical properties | | | | | | | | | | | | |

-continued

|  | Example | | | | | | | Comparative Example | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| Tensile strength (kgf/cm$^2$) | 171 | 163 | 175 | 180 | 151 | 142 | 145 | 157 | 151 | 148 | 103 | 148 |
| Elongation (%) | 250 | 240 | 250 | 200 | 270 | 220 | 210 | 300 | 300 | 270 | 220 | 250 |
| Aging test (air-heating degradation, 200° C. × 70 hr) | | | | | | | | | | | | |
| Tensile strength (kgf/cm$^2$) | 160 | 128 | 165 | 163 | 143 | 137 | 136 | 162 | 138 | 131 | 89 | 133 |
| Elongation (%) | 190 | 140 | 210 | 160 | 210 | 170 | 170 | 260 | 150 | 240 | 170 | 180 |
| Steam immersion test (170° C. × 70 hr) | | | | | | | | | | | | |
| Tensile test (kgf/cm$^2$) | 168 | 158 | 171 | 145 | 147 | 131 | 139 | 130 | 141 | 141 | 92 | 147 |
| Elongation (%) | 240 | 230 | 250 | 190 | 250 | 210 | 210 | 330 | 280 | 260 | 210 | 270 |
| Compression set test (200° C. × 70 hr) | | | | | | | | | | | | |
| CS (%) | 23 | 22 | 23 | 30 | 24 | 22 | 23 | 35 | 29 | 30 | 32 | 22 |
| Compression stress test (150° C. × 50% compressed) (kgf/cm$^2$) | 48 | 51 | 47 | 53 | 45 | 43 | 44 | 23 | 30 | 32 | 31 | 44 |

The fluoroelastomer composition of this invention, as compared with a mere mixture of the fluoroelastomer and the ethylenic resin, is excellent in extrudability and roll-processability and is easy to mold. Also, the crosslinked product obtained by crosslinking the crosslinkable fluoroelastomer composition of this invention is excellent in heat resistance, compression set and resistance to compressive load.

Owing to these properties, the crosslinkable rubber composition of this invention can be preferably used in the following applications: oil-resistant, chemical-resistant, heat-resistant, steam-resistant or weather-resistant packings, O-rings, hoses, other sealants, diaphragms and valves in transportation facilities such as automobile, vessel, aircraft and the like; similar packings, O-rings, sealants, diaphragms, valves, hoses, rolls and tubes in chemical plants; chemical-resistant coatings and linings in chemical plants; similar packings, O-rings, hoses, sealants, belts, diaphragms, valves, rolls and tubes in food plants and food facilities including domestic ones; similar packings, O-rings, hoses, sealants, diaphragms, valves and tubes in atomic power plants; similar packings, O-rings, hoses, sealants, diaphragms, valves, rolls, tubes, linings, mandrels, electric wires, flexible joints, belts, rubber plates and weather strips in general industrial parts; roll blades in PPC copying machines.

Specific applications include the following:

(A) Automobiles
(a) Sealants
   * Core of needle valve of carburettor
   * Flange gasket of carburettor
   * Packing for power piston
   * O-ring for gasoline-mixing pump
   * Sealant for cylinder liner
   * Sealant for valve stem
   * Sealant for front pump of automatic transmission
   * Sealant for rear axle pinion
   * Gasket for universal joint
   * Sealant for pinion of speed meter
   * Piston cup of foot brake
   * Sealant for O-ring of torque transmission
   * Sealant for exhaust gas recombustion unit
   * Sealant for bearing
   * O-ring for gasoline pump
   * Sealant for gasoline hose
   * Sealant for car air conditioner
(b) Hoses
   * Fuel hose
   * EGR tube
   * Twin carburettor tube
(c) Diaphragms
   * Diaphragm for gasoline pump
   * Diaphragm for carburettor sensor
(d) Other applications
   * Vibration-damping rubber (engine mount, exhaust gas unit, etc.)
   * Hose for recombustion unit
(B) Chemical industry
(a') Sealants
   * Sealant for pump, flow meter and pipe for chemicals
   * Sealant for heat exchanger
   * Packing for glass condenser in sulfuric acid production system
   * Sealant for agricultural chemical spreader and agricultural chemical transfer pump.
   * Sealant for gas pipe
   * Sealant for plating solution
   * Packing for high temperature vacuum drier
   * Sealant for belt rollers for paper manufacturing
   * Sealant for fuel cell
   * Sealant for joints of air tunnel
(b') Rolls
   * Trichrene-resistant roll (for use in fiber dyeing)
(c') Linings and coatings
   * Corrosion-resistant lining for Alumite processing bath
   * Coating for masking mean for plating
   * Lining for gasoline tank
   * Lining for wind tunnel
(d') Other applications
   * Acid-resistant hose (for concentrated sulfuric acid)
   * Packing for tube joint in gas chromatograph and pH meter
   * Hose for chlorine gas transfer
   * Oil-resistant hose
   * Hose for rainwater drainage in benzene or toluene storage tank
   * Expansion joint for gas duct (coating of asbestos cloth)
(C) General machines
(a'') Sealants
   * Sealant for hydraulic and lubricating machines
   * Sealant for bearings
   * Sealant for drying type copying machine
   * Sealant for window and other parts of dry cleaning apparatus
   * Sealant for uranium hexafluoride enrichment apparatus
   * Seal (vacuum) valve for cyclotron, etc.
   * Sealant for automatic packing machine (b") Other applications
* Belt for dry type copying machine
* Diaphragm for pump for analysis of sulfurous acid or chlorine gas in air (instrument for measurement of environmental pollution)
* Lining for snake pump
* Rolls and belts for printing machines
* Squeezing roll for acid cleaning (D) Aircrafts
* Sealant for valve stem of jet engine
* Hose, gasket and O-ring for fuel supply
* Sealant for rotating shaft
* Gasket for hydraulic system
* Sealant for fire wall (E) Vessels
* Stern sealant for propeller shaft of screw
* Sealant for charge-discharge valve stem of diesel engine
* Valve sealant for butterfly valve
* Shaft sealant for butterfly valve (F) Food and medical care industries
* Sealant for plate type heat exchanger
* Sealant for solenoid valve of automatic vending machine
* Stopper for medicine bottle (G) Electric industry
* Cap for insulating oil used in Japanese bullet train
* Benching sealant for liquid-sealed transformer
* Jacket for oil well cable

What is claimed is:

1. A rubber composition obtained by subjecting a mixture of (I) 35-95 parts by weight of a fluoroelastomer, (II) 65-5 parts by weight of at least one member selected from the group consisting of polyethylene, ethylene-vinyl acetate copolymer and ethylene-unsaturated carboxylic acid ester copolymer, and (III) an organic peroxide to reaction while imparting shearing deformation to the mixture, wherein the total amount of component (I) plus component (II) is 100 parts by weight.

2. The rubber composition according to claim 1, wherein the organic peroxide is selected from the group consisting of 2,5-dimethyl-2,5-di(t-butylperoxy)hexyne-3, 2,5-dimethyl-2,5-di(t-butylperoxy)hexane, α,α'-bis-(t-butylperoxy)-p-diisopropylbenzene, dicumyl peroxide, di-t-butyl peroxide, 1,1-bis(t-butylperoxy)-3,3,5-trimethylcyclohexane, 2,4-dichlorobenzoyl peroxide, benzoyl peroxide and p-chlorobenzoyl peroxide.

3. The rubber composition according to claim 1, wherein the organic peroxide is 5-dimethyl-2,5-di(t-butylperoxy)hexyne-3, 2,5-dimethyl-2,5-di(t-butylperoxy)hexane or α,α'-bis(t-butylperoxy)-p-diisopropylbenzene.

4. The rubber composition according to claim 1, wherein the proportion of the organic peroxide is 0.01-5 parts by weight per 100 parts by weight of a total of component (I) plus component (II).

5. The rubber composition according to claim 1, wherein the proportion of the organic peroxide is 0.05-2 parts by weight per 100 parts by weight of a total of component (I) plus component (II).

6. The rubber composition according to claim 1, wherein the fluoroelastomer (I) is a (co)polymer of at least one fluorine-containing monomer selected from the group consisting of vinylidene fluoride, hexafluoropropylene, pentafluoropropylene, trifluoroethylene, trifluorochloroethylene, tetrafluoroethylene, vinyl fluoride, perfluoro(methyl vinyl ether) and perfluoro(propylvinylidene) or a rubber obtained by copolymerizing the fluorine-containing monomer with a monomer copolymerizable therewith.

7. The rubber composition according to claim 6, wherein the monomer copolymerizable with the fluorine-containing monomer is a vinyl compound, an olefin compound, a diene compound or a chlorine-, bromine- or iodine-containing compound.

8. The rubber composition according to claim 1, wherein the fluoroelastomer (I) is selected from the group consisting of vinyl fluoride-hexafluoropropylene copolymer, vinylidene fluoride-hexafluoropropylene-tetrafluoroethylene terpolymer, tetrafluoroethylene-propylene copolymer and tetrafluoroethylene-vinylidene fluoride-propylene terpolymer.

9. The rubber composition according to claim 1, wherein the fluoroelastomer (I) has a Mooney viscosity ($ML_{1+4}$, 100° C.) of 30-150.

10. The rubber composition according to claim 1, wherein the ethylene-unsaturated carboxylic acid ester copolymer is ethylene-methyl (meth)acrylate copolymer, ethylene-ethyl (meth)acrylate copolymer or ethylene-butyl (meth)acrylate copolymer.

11. The rubber composition according to claim 1, wherein said component (II) is ethylene-vinyl acetate copolymer having a vinyl acetate content of 5-45% by weight.

12. The rubber composition according to claim 1, wherein component (II) has a melt flow index of 0.5-150 g/10 min.

13. The rubber composition according to claim 1, wherein component (II) has a melt flow index of 1-40 g/10 min.

14. The rubber composition according to claim 1, wherein the weight ratio of component (I) to component (II) is 65-90/35-10 and wherein the total amount of the component (I) plus component (II) is 100 parts by weight.

* * * * *